United States Patent
Wichman et al.

(10) Patent No.: US 7,434,036 B1
(45) Date of Patent: Oct. 7, 2008

(54) SYSTEM AND METHOD FOR EXECUTING SOFTWARE PROGRAM INSTRUCTIONS USING A CONDITION SPECIFIED WITHIN A CONDITIONAL EXECUTION INSTRUCTION

(75) Inventors: Shannon A. Wichman, McKinney, TX (US); Seshagiri Prasad Kalluri, Richardson, TX (US)

(73) Assignee: VeriSilicon Holdings Co. Ltd., Santa Clara, CA (US)

( * ) Notice: Subject to any disclaimer, the term of this patent is extended or adjusted under 35 U.S.C. 154(b) by 291 days.

(21) Appl. No.: 10/231,948

(22) Filed: Aug. 30, 2002

(51) Int. Cl.
*G06F 9/30* (2006.01)

(52) U.S. Cl. .................................. 712/234

(58) Field of Classification Search ............... 712/234, 712/235
See application file for complete search history.

(56) References Cited

U.S. PATENT DOCUMENTS

| | | | |
|---|---|---|---|
| 5,257,360 A * | 10/1993 | Schnizlein et al. | 711/118 |
| 5,303,356 A * | 4/1994 | Vassiliadis et al. | 712/238 |
| 5,442,756 A * | 8/1995 | Grochowski et al. | 712/238 |
| 5,634,103 A * | 5/1997 | Dietz et al. | 712/235 |
| 5,732,235 A * | 3/1998 | Kahle et al. | 712/209 |
| 5,742,804 A * | 4/1998 | Yeh et al. | 712/237 |
| 5,822,576 A * | 10/1998 | Dinkjian et al. | 712/239 |
| 5,903,750 A * | 5/1999 | Yeh et al. | 712/236 |
| 5,948,100 A * | 9/1999 | Hsu et al. | 712/238 |
| 5,999,738 A * | 12/1999 | Schlansker et al. | 717/156 |
| 6,065,115 A * | 5/2000 | Sharangpani et al. | 712/235 |
| 6,205,544 B1 * | 3/2001 | Mills et al. | 712/230 |
| 6,223,280 B1 * | 4/2001 | Horton et al. | 712/240 |
| 6,360,316 B1 * | 3/2002 | Baraz | 712/226 |
| 6,611,956 B1 * | 8/2003 | Ogawa et al. | 717/152 |
| 6,851,046 B1 * | 2/2005 | Delvaux et al. | 712/236 |
| 2002/0199090 A1 | 12/2002 | Wilson | |

FOREIGN PATENT DOCUMENTS

EP 0130381 * 1/1985

OTHER PUBLICATIONS

Tyson, Gary Scott. "The Effects of Predicated Execution on Branch Prediction." Proceedings of the 27th annual international symposium on Microarchitecture: 1994. pp. 196-206.*

(Continued)

*Primary Examiner*—Aimee J Li

(57) ABSTRACT

A processor is disclosed including an instruction unit and an execution unit. The instruction unit fetches and decodes instructions, including a conditional execution instruction. The conditional execution instruction specifies one or more instructions to be conditionally executed (i.e., "target instructions"), a register of the processor, and a condition within the register. When the instruction unit fetches and decodes the conditional execution instruction, the execution unit saves results of the one or more target instructions dependent upon the existence of the specified condition in the specified register during execution of the conditional execution instruction. A system including the processor is described, as is a method for conditionally executing at least one instruction.

19 Claims, 8 Drawing Sheets

800

INPUT A CONDITIONAL EXECUTION INSTRUCTION AND ONE OR MORE "TARGET" INSTRUCTIONS, WHEREIN THE CONDITIONAL EXECUTION INSTRUCTION SPECIFIES THE TARGET INSTRUCTIONS, A REGISTER OF THE PROCESSOR, AND A CONDITION WITHIN THE REGISTER    802

SAVE A RESULT OF EACH OF THE TARGET INSTRUCTIONS DEPENDENT UPON THE EXISTENCE OF THE SPECIFIED CONDITION WITHIN THE SPECIFIED REGISTER DURING EXECUTION OF THE CONDITIONAL EXECUTION INSTRUCTION    804

OTHER PUBLICATIONS

Hennessy, John L. and David A. Patterson. Computer Architecture: A Quantitative Approach. 2nd Ed. Morgan: 1996. pp. C-4 and C-9.*

Evers, Marius et al. "Using Hybrid Branch Predictors to Improve Branch Prediction Accuracy in the Presence of Context Switches." ISCA: 1996. p. 2.*

Chow, Paul and Mark Horowitz. "Architectural Tradeoffs in the Design of MIPS-X." ACM: 1987. pp. 301 and 305.*

"The PowerPC Architecture: A specification for a new family of RISC processors." IBM, 2nd ed., May 1994, pp. 19-22, 32-40, 57, 384-388.—Author(s)—n/a.

* cited by examiner

SYSTEM AND METHOD FOR EXECUTING SOFTWARE PROGRAM INSTRUCTIONS USING A CONDITION SPECIFIED WITHIN A CONDITIONAL EXECUTION INSTRUCTION

BACKGROUND OF THE INVENTION

1. Field of the Invention

This invention relates generally to data processing, and, more particularly, to apparatus and methods for conditionally executing software program instructions.

2. Description of the Related Art

Many modern processors employ a technique called pipelining to execute more software program instructions (instructions) per unit of time. In general, processor execution of an instruction involves fetching the instruction (e.g., from a memory system), decoding the instruction, obtaining needed operands, using the operands to perform an operation specified by the instruction, and saving a result. In a pipelined processor, the various steps of instruction execution are performed by independent units called pipeline stages. In the pipeline stages, corresponding steps of instruction execution are performed on different instructions independently, and intermediate results are passed to successive stages. By permitting the processor to overlap the executions of multiple instructions, pipelining allows the processor to execute more instructions per unit of time.

In practice, instructions are often interdependent, and these dependencies often result in "pipeline hazards." Pipeline hazards result in stalls that prevent instructions from continually entering a pipeline at a maximum possible rate. The resulting delays in pipeline flow are commonly called "bubbles." The detection and avoidance of hazards presents a formidable challenge to designers of pipeline processors, and hardware solutions can be considerably complex.

There are three general types of pipeline hazards: structural hazards, data hazards, and control hazards. A structural hazard occurs when instructions in a pipeline require the same hardware resource at the same time (e.g., access to a memory unit or a register file, use of a bus, etc.). In this situation, execution of one of the instructions must be delayed while the other instruction uses the resource.

A "data dependency" is said to exist between two instructions when one of the instructions requires a value produced by the other. A data hazard occurs in a pipeline when a first instruction in the pipeline requires a value produced by a second instruction in the pipeline, and the value is not yet available. In this situation, the pipeline is typically stalled until the operation specified by the second instruction is carried out and the result is produced.

In general, a "scalar" processor issues instructions for execution one at a time, and a "superscalar" processor is capable of issuing multiple instructions for execution at the same time. A pipelined scalar processor concurrently executes multiple instructions in different pipeline stages; the executions of the multiple instructions are overlapped as described above. A pipelined superscalar processor, on the other hand, concurrently executes multiple instructions in different pipeline stages, and is also capable of concurrently executing multiple instructions in the same pipeline stage. Pipeline hazards typically have greater negative impacts on performances of pipelined superscalar processors than on performances of pipelined scalar processors. Examples of pipelined superscalar processors include the popular Intel® Pentium® processors (Intel Corporation, Santa Clara, Calif.) and IBM® PowerPC® processors (IBM Corporation, White Plains, N.Y.).

Conditional branch/jump instructions are commonly used in software programs (i.e., code) to effectuate changes in control flow. A change in control flow is necessary to execute one or more instructions dependent on a condition. Typical conditional branch/jump instructions include "branch if equal," "jump if not equal," "branch if greater than," etc.

A "control dependency" is said to exist between a non-branch/jump instruction and one or more preceding branch/jump instructions that determine whether the non-branch/jump instruction is executed. A control hazard occurs in a pipeline when a next instruction to be executed is unknown, typically as a result of a conditional branch/jump instruction. When a conditional branch/jump instruction occurs, the correct one of multiple possible execution paths cannot be known with certainty until the condition is evaluated. Any incorrect prediction typically results in the need to purge partially processed instructions along an incorrect path from a pipeline, and refill the pipeline with instructions along the correct path.

A software technique called "predication" provides an alternate method for conditionally executing instructions. Predication may be advantageously used to eliminate branch instructions from code, effectively converting control dependencies to data dependencies. If the resulting data dependencies are less constraining than the control dependencies that would otherwise exist, instruction execution performance of a pipelined processor may be substantially improved.

In predicated execution, the results of one or more instructions are qualified dependent upon a value of a preceding predicate. The predicate typically has a value of "true" (e.g., binary "1") or "false" (e.g., binary "0"). If the qualifying predicate is true, the results of the one or more subsequent instructions are saved (i.e., used to update a state of the processor). On the other hand, if the qualifying predicate is false, the results of the one or more instructions are not saved (i.e., are discarded).

In some known processors, values of qualifying predicates are stored in dedicated predicate registers. In some of these processors, different predicate registers may be assigned (e.g., by a compiler) to instructions along each of multiple possible execution paths. Predicated execution may involve executing instructions along all possible execution paths of a conditional branch/jump instruction, and saving the results of only those instructions along the correct execution path. For example, assume a conditional branch/jump instruction has two possible execution paths. A first predicate register may be assigned to instructions along one of the two possible execution paths, and a second predicate register may be assigned to instructions along the second execution path. The processor attempts to execute instructions along both paths in parallel. When the processor determines the values of the predicate registers, results of instructions along the correct execution path are saved, and the results of instructions along the incorrect execution path are discarded.

The above method of predicated execution involves associating instructions with predicate registers (i.e., "tagging" instructions along the possible execution paths with an associated predicate register). This tagging is typically performed by a compiler, and requires space (e.g., fields) in instruction formats to specify associated predicate registers. This presents a problem in reduced instruction set computer (RISC) processors typified by fixed-length and densely-packed instruction formats.

Another example of conditional execution involves the TMS320C6x processor family (Texas Instruments Inc., Dallas, Tex.). In the 'C6x processor family, all instructions are conditional. Multiple bits of a field in each instruction are allocated for specifying a condition. If no condition is specified, the instruction is executed. If an instruction specifies a condition, and the condition is true, the instruction is executed. On the other hand, if the specified condition is false, the instruction is not executed. This form of conditional execution also presents a problem in RISC processors in that multiple bits are allocated in fixed-length and densely-packed instruction formats.

SUMMARY OF THE INVENTION

A processor is disclosed including an instruction unit and an execution unit. The instruction unit fetches and decodes instructions, including a conditional execution instruction. The conditional execution instruction specifies one or more instructions to be conditionally executed (i.e., "target instructions"), a register of the processor, and a condition within the register. When the instruction unit fetches and decodes the conditional execution instruction, the execution unit saves results of the one or more target instructions dependent upon the existence of the specified condition in the specified register during execution of the conditional execution instruction. A system including the processor is described, as is a method for conditionally executing one or more instructions.

BRIEF DESCRIPTION OF THE DRAWINGS

Other objects and advantages of the invention will become apparent upon reading the following detailed description and upon reference to the accompanying drawings in which.

Figure 1:
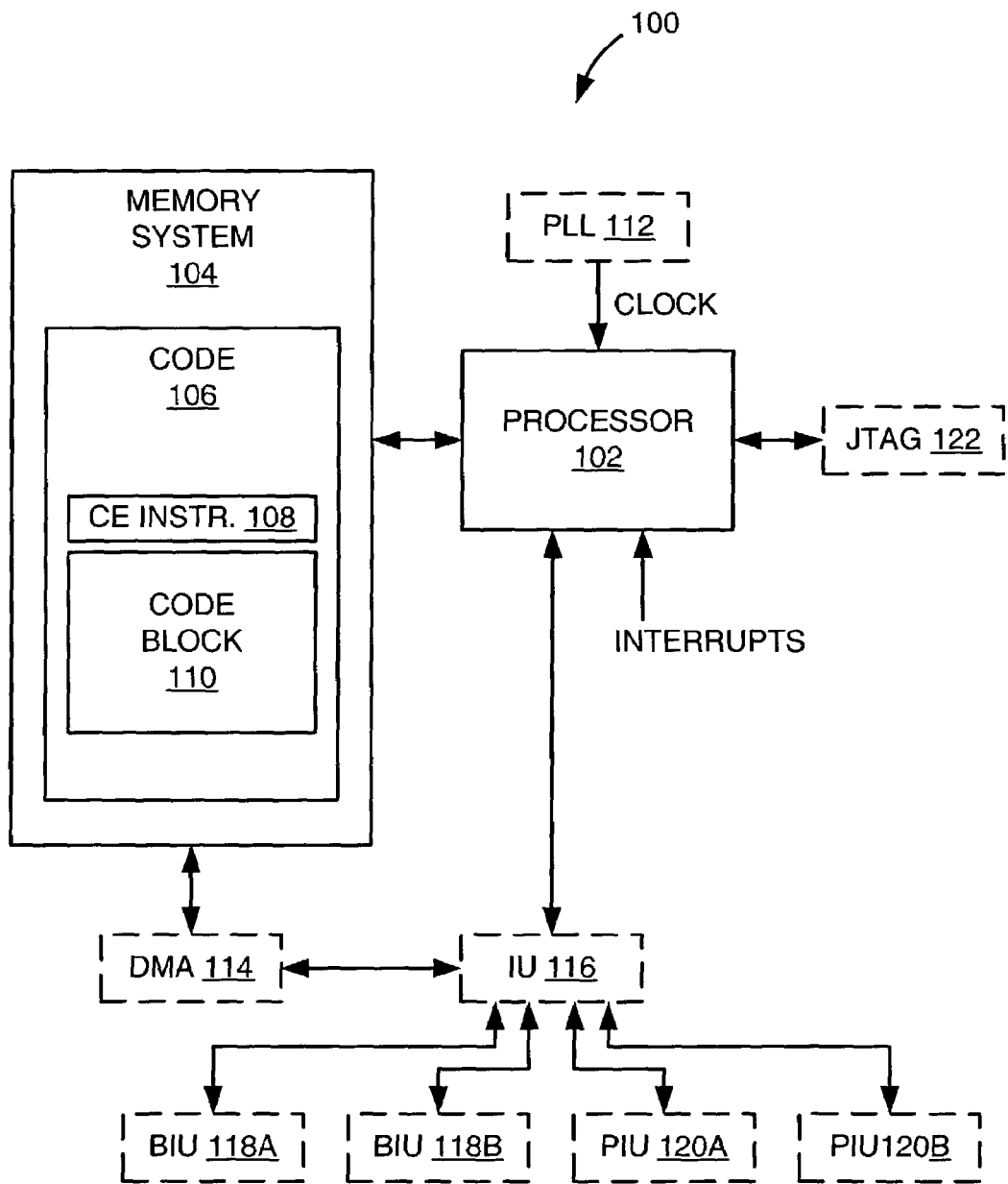
FIG. 1 is a diagram of one embodiment of a data processing system including a processor coupled to a memory system, wherein the memory system includes software program instructions (i.e., "code"), and wherein the code includes a conditional execution (CE) instruction and a code block including one or more instructions to be conditionally executed.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

FIG. 1 is a diagram of one embodiment of a data processing system 100 including a processor 102 coupled to a memory system 104. The processor 102 executes instructions of a predefined instruction set. As illustrated in FIG. 1, the memory system 104 includes a software program (i.e., code) 106 including instructions from the instruction set. In general, the processor 102 fetches and executes instructions stored in the memory system 104. In the embodiment of FIG. 1, the code 106 includes a conditional execution (CE) instruction 108 of the instruction set, and a code block 110 specified by the conditional execution instruction 108. In general, the code block 110 includes one or more instructions selected from the instruction set. The conditional execution instruction 108 also specifies a condition that determines whether execution results of the one or more instructions of the code block 110 are saved in the processor 102 and/or the memory system 104.

The memory system 104 may include, for example, volatile memory structures (e.g., dynamic random access memory structures, static random access memory structures, etc.) and/or non-volatile memory structures (read only memory structures, electrically erasable programmable read only memory structures, flash memory structures, etc.).

In the embodiment of FIG. 1, during execution of the code 106, the processor 102 fetches the conditional execution instruction 108 from the memory system 104 and executes the conditional execution instruction 108. In general, during execution of the conditional execution instruction 108, the processor 102 determines the code block 110 and the condition specified by the conditional execution instruction 108, and evaluates the condition to determine if the condition exists in the processor 102. The processor 102 also fetches the instructions of the code block 110 from the memory system 104, and executes each of the instructions of the code block 110, producing corresponding execution results within the processor 102. The execution results of the instructions of the code block 110 are saved in the processor 102 and/or the memory system 104 dependent upon the existence of the condition specified by the conditional execution instruction 108 in the processor 102. In other words, the condition specified by the conditional execution instruction 108 qualifies the writeback of the execution results of the instructions of the code block 110. The instructions of the code block 110 may otherwise traverse the pipeline normally. The results of the instructions of the code block 110 are used to change a state of the processor 102 and/or the memory system 104 only if the condition specified by the conditional execution instruction 108 exists in the processor 102.

In the embodiment of FIG. 1, the processor 102 implements a load-store architecture. That is, the instruction set includes load instructions used to transfer data from the memory system 104 to registers of the processor 102, and store instructions used to transfer data from the registers of the processor 102 to the memory system 104. Instructions other than the load and store instructions specify register operands, and register-to-register operations. In this manner, the register-to-register operations are decoupled from accesses to the memory system 104.

As indicated in FIG. 1, the processor 102 receives a CLOCK signal and executes instructions dependent upon the CLOCK signal. The data processing system 100 may include a phase-locked loop (PLL) circuit 112 the generates the CLOCK signal. The data processing system 100 may also include a direct memory access (DMA) circuit 114 for accessing the memory system 104 substantially independent of the processor 102. The data processing system 100 may also include bus interface units (BIUs) 118A and 118B for coupling to external buses, and/or peripheral interface units (PIUs) 120A and 120B for coupling to external peripheral devices. An interface unit (IU) 116 may form an interface between the bus interfaces units (BIUs) 118A and 118B and/or the peripheral interface units (PIUs) 120A and 120B, the processor 102, and the DMA circuit 114. The data processing system 100 may also include a JTAG (Joint Test Action Group) circuit 122 including an IEEE Standard 1149.1 compatible boundary scan access port for circuit-level testing of the processor 102. The processor 102 may also receive and respond to external interrupt signals (i.e., interrupts) as indicted in FIG. 1.

Figure 2A:
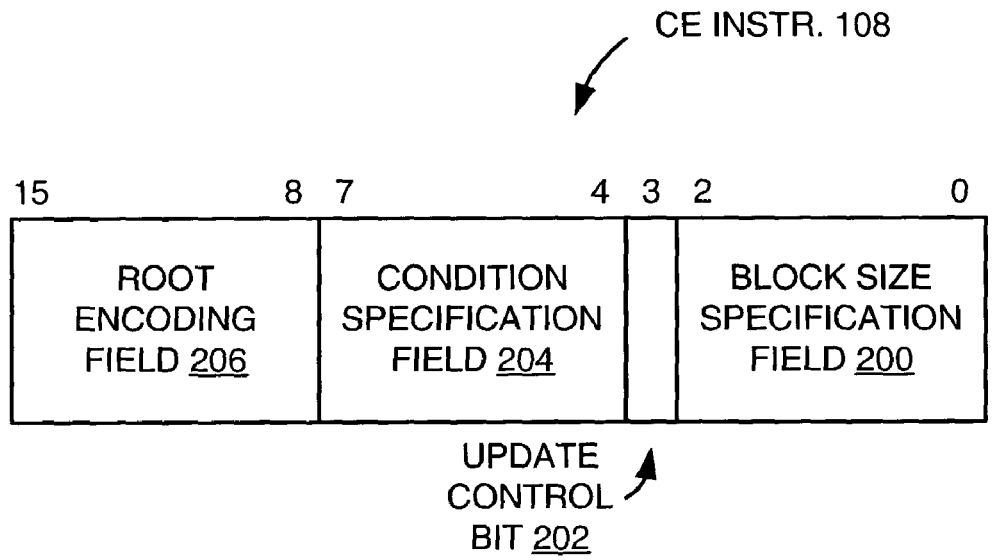
FIG. 2A is a diagram of one embodiment of the conditional execution (CE) instruction of FIG. 1 that specifies conditional execution dependent upon contents of a flag register within the processor of FIG. 1.
Figure 2B:
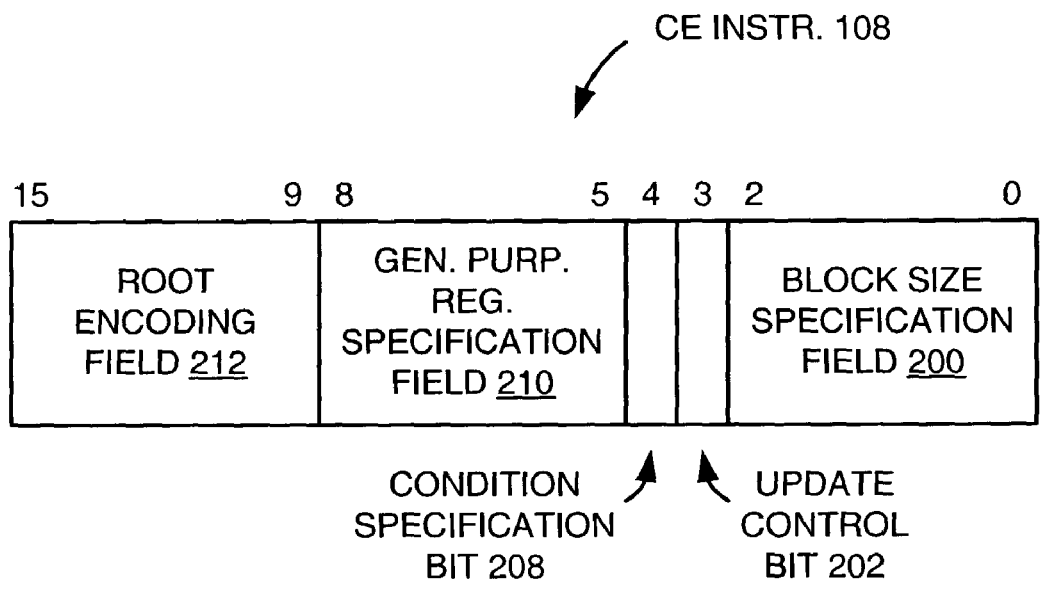
FIG. 2B is a diagram of a second embodiment of the conditional execution (CE) instruction of FIG. 1 that specifies conditional execution dependent upon contents of a general purpose register within the processor of FIG. 1.

FIGS. 2A and 2B depict two different embodiments of the conditional execution instruction 108 of FIG. 1. In the embodiments of FIGS. 2A and 2B, the conditional execution instruction 108 and the one or more instructions of the code block 110 of FIG. 1 are fixed-length instructions (e.g., 16-bit instructions), and the instructions of the code block 110 immediately follow the conditional execution instruction 108 in the code 106 of FIG. 1. It is noted that other embodiments of the conditional execution instruction 108 of FIG. 1 are possible and contemplated.

FIG. 2A is a diagram of one embodiment of the conditional execution (CE) instruction 108 of FIG. 1 that specifies conditional execution dependent upon contents of a flag register within the processor 102 of FIG. 1. In the embodiment of FIG. 2A, the conditional execution instruction 108 includes a block size specification field 200, an update control bit 202, a conditional specification field 204, and a root encoding field 206. The block size specification field 200 is used to store a value indicating a number of instructions immediately following the conditional execution instruction 108 and making up the code block 110.

In the embodiment of FIG. 2A, the block size specification field 200 is a 3-bit field specifying a code block including from 1 (block size specification field="000") to 8 (block size specification field="111") instructions immediately following the conditional execution instruction 108.

As described below, the processor 102 includes a load/store unit for transferring data values between the processor 102 and the memory system 104. The update control bit 202 indicates whether an address register of the load/store unit is to be updated. For example, the assembly code instruction: ldu r5,a0,1 specifies that data at an address contained in an address register "a0" in the load/store unit of the processor 102 is to be loaded from the memory system 104 into a register "r5" in the processor 102, and the value "1" is to be added to the address in the address register "a0" (i.e., the address in the address register "a0" is to be updated by the value "1").

The root encoding field 206 identifies an operation code (opcode) of the conditional execution instruction 108 of FIG. 2A. As described below, the processor 102 of FIG. 1 includes a flag register. In the embodiment of FIG. 2A, each opcode of the conditional execution instruction 108 is associated with the flag register. As a result, the root encoding field 206 specifies both an opcode of the conditional execution instruction 108 of FIG. 2A and the flag register of the processor 102.

In general, the conditional specification field 204 specifies the condition that qualifies the execution results of the instructions in the code block 110 of FIG. 1. In the embodiment of FIG. 2A, the conditional specification field 204 is a 4-bit field that specifies a value of a flag bit in the flag register of the processor 102 during execution of the conditional execution instruction 108 that qualifies the saving of the execution results of the instructions of the code block 110. As described in more detail below, flag bits stored in the flag register of the processor 102 include:

| | |
|---|---|
| v = | 32-Bit Overflow Flag. Cleared (i.e., '0') when a sign of a result of a twos-complement addition is the same as signs of 32-bit operands (where both operands have the same sign); set (i.e., '1') when the sign of the result differs from the signs of the 32-bit operands. |
| gv = | Guard Register 40-Bit Overflow Flag. (Same as the 'v' flag bit described above, but for 40-bit operands.) |
| sv = | Sticky Overflow Flag. (Same as the 'v' flag bit described above, but once set, can only be cleared through software by writing a '0' to the 'sv' bit.) |
| gsv = | Guard Register Sticky Overflow Flag. (Same as the 'gv' flag bit described above, but once set, can only be cleared through software by writing a '0' to the 'gsv' bit.) |
| c = | Carry Flag. Set when a carry occurs during a twos-complement addition for 16-bit operands; cleared when no carry occurs. |
| ge = | Greater Than Or Equal To Flag. Set when a result is greater than or equal to zero; cleared when the result is not greater than or equal to zero. |
| gt = | Greater Than Flag. Set when a result is greater than zero; cleared when the result is not greater than zero. |
| z = | Equal to Zero Flag. Set when a result is equal to zero; cleared when the result is not equal to zero. |

Table 1 below lists exemplary encodings of the conditional specification field 204:

TABLE 1

Exemplary Encodings of the Conditional Specification Field 204.

| Field Value | Flag Bit | Flag Bit Value |
|---|---|---|
| 0000 | v | 0 |
| 0001 | v | 1 |
| 0010 | gv | 0 |
| 0011 | gv | 1 |
| 0100 | sv | 0 |
| 0101 | sv | 1 |
| 0110 | gsv | 0 |
| 0111 | gsv | 1 |
| 1000 | c | 0 |
| 1001 | c | 1 |
| 1010 | ge | 0 |
| 1011 | ge | 1 |
| 1100 | gt | 0 |
| 1101 | gt | 1 |
| 1110 | z | 0 |
| 1111 | z | 1 |

For example, referring to Table 1 above, a 1011 encoding of the conditional specification field 204 of the conditional execution instruction 108 specifies a condition that the ge flag bit of the flag register be 1. If the ge flag bit of the flag register is 1 during execution of the conditional execution instruction 108, the execution results of the instructions of the code block 110 of FIG. 1 are saved. On the other hand, if the ge flag bit of the flag register is 0 during execution of the conditional execution instruction 108, the execution results of the instructions of the code block 110 of FIG. 1 are not saved (i.e., the execution results are discarded).

FIG. 2B is a diagram of a second embodiment of the conditional execution (CE) instruction 108 of FIG. 1 that specifies conditional execution dependent upon contents of a general purpose register within the processor 102 of FIG. 1. In the embodiment of FIG. 2B, the conditional execution instruction 108 includes the block size specification field 200, the update control bit 202, a conditional specification bit 208, a general purpose register specification field 210, and a root encoding field 212. As described above, the block size specification field 200 is used to store a value indicating a number of instructions immediately following the conditional execution instruction 108 and making up the code block 110, and the update control bit 202 indicates whether an address register of the load/store unit is to be updated.

In general, the general purpose register specification field 210 specifies one of a number of general purpose registers within the processor 102 of FIG. 1 used to qualify the execution results of the one or more instructions of the code block 110 of FIG. 1. In the embodiment of FIG. 2B, the processor 102 includes 16 general purpose registers, and the general purpose register specification field 210 is a 4-bit field that specifies one of the 16 general purpose registers. The root encoding field 212 identifies the opcode of the conditional execution instruction 108 of FIG. 2B.

The conditional specification bit 208 specifies the condition used to qualify the execution results of the instructions in the code block 110. In the embodiment of FIG. 2B, if the conditional specification bit 208 is a 0, the execution results of the instructions of the code block 110 of FIG. 1 are qualified (i.e., stored) if a value stored in the general purpose register of the processor 102 of FIG. 1 specified by the general purpose register specification field 210 is equal to zero during execution of the conditional execution instruction 108. If the conditional specification bit 208 is a 1, the execution results of the instructions of the code block 110 are stored if the value stored in the specified general purpose register is not equal to zero.

Figure 3:
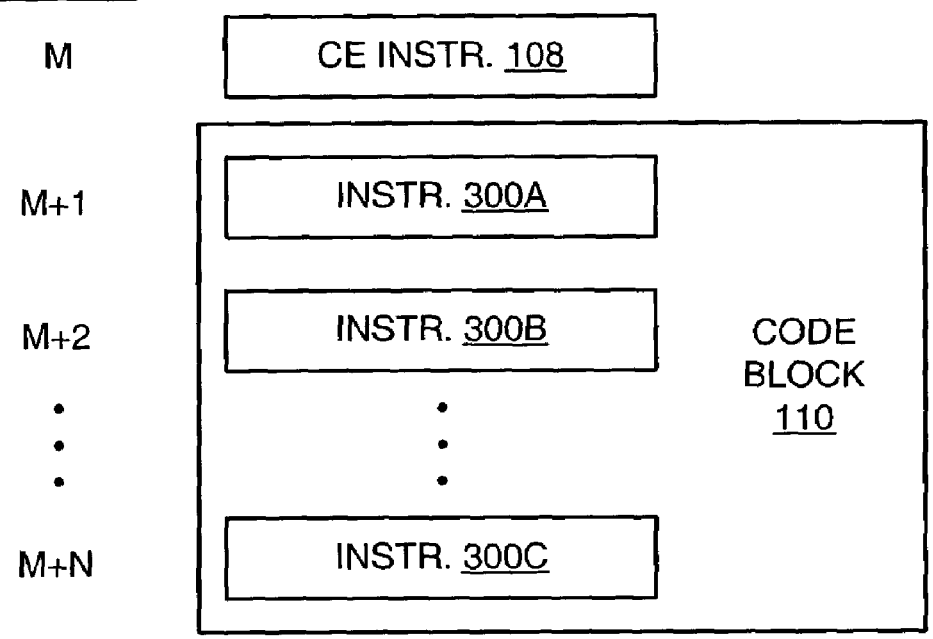
FIG. 3 is a diagram depicting an arrangement of the conditional execution (CE) instruction of FIG. 1 and instructions of the code block of FIG. 1 in the code of FIG. 1.

FIG. 3 is a diagram depicting an arrangement of the conditional execution instruction 108 of FIG. 1 and instructions of the code block 110 of FIG. 1 in the code 106 of FIG. 1. In the embodiment of FIG. 3, the code block 110 includes n instructions. The conditional execution instruction 108 is instruction number m in the code 106, and the n instructions of the code block 110 includes instructions 300A, 300B, and 300C. The instruction 300A immediately follows the conditional execution instruction 108 in the code 106, and is instruction number m+1 of the code 106. The instruction 300B immediately follows the instruction 300A in the code 106, and is instruction number m+2 of the code 106. The instruction 300C is instruction number m+n of the code 106, and is the nth (i.e., last) instruction of the code block 110.

Figure 4:
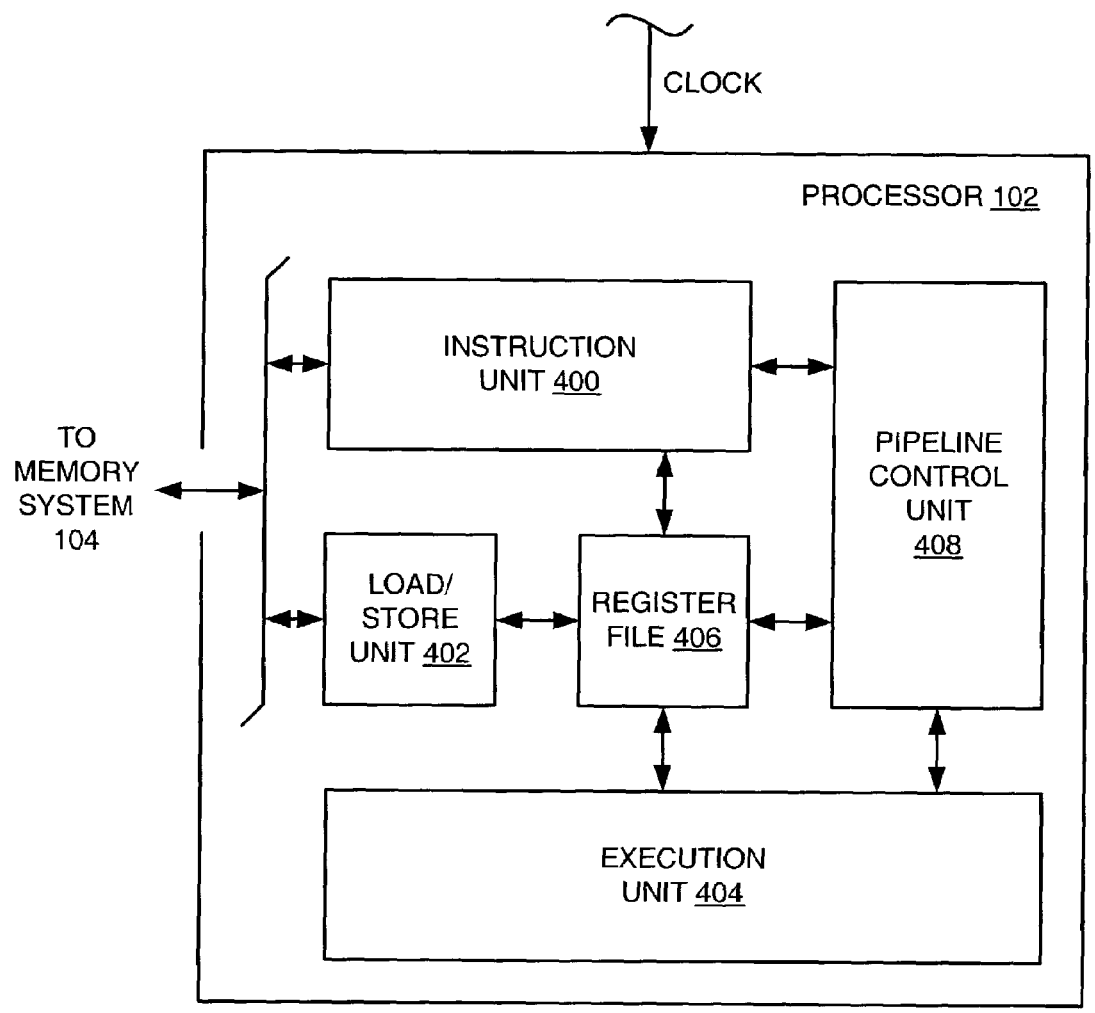
FIG. 4 is a diagram of one embodiment of the processor of FIG. 1, wherein the processor includes an instruction unit, a load/store unit, an execution unit, a register file, and a pipeline control unit.

FIG. 4 is a diagram of one embodiment of the processor 102 of FIG. 1. In the embodiment of FIG. 4, the processor 102 includes an instruction unit 400, a load/store unit 402, an execution unit 404, a register file 406, and a pipeline control unit 408. In the embodiment of FIG. 4, the processor 102 is a pipelined superscalar processor. That is, the processor 102 implements an instruction execution pipeline including multiple pipeline stages, concurrently executes multiple instructions in different pipeline stages, and is also capable of concurrently executing multiple instructions in the same pipeline stage.

In general, the instruction unit 400 fetches instructions from the memory system 104 of FIG. 1 and decodes the instructions, thereby producing decoded instructions. The load/store unit 402 is used to transfer data between the processor 102 and the memory system 104 as described above. The execution unit 404 is used to perform operations specified by instructions (and corresponding decoded instructions). The register file 406 includes multiple registers of the processor 102, and is described in more detail below. The pipeline control unit 408 implements the instruction execution pipeline described in more detail below.

Figure 5:
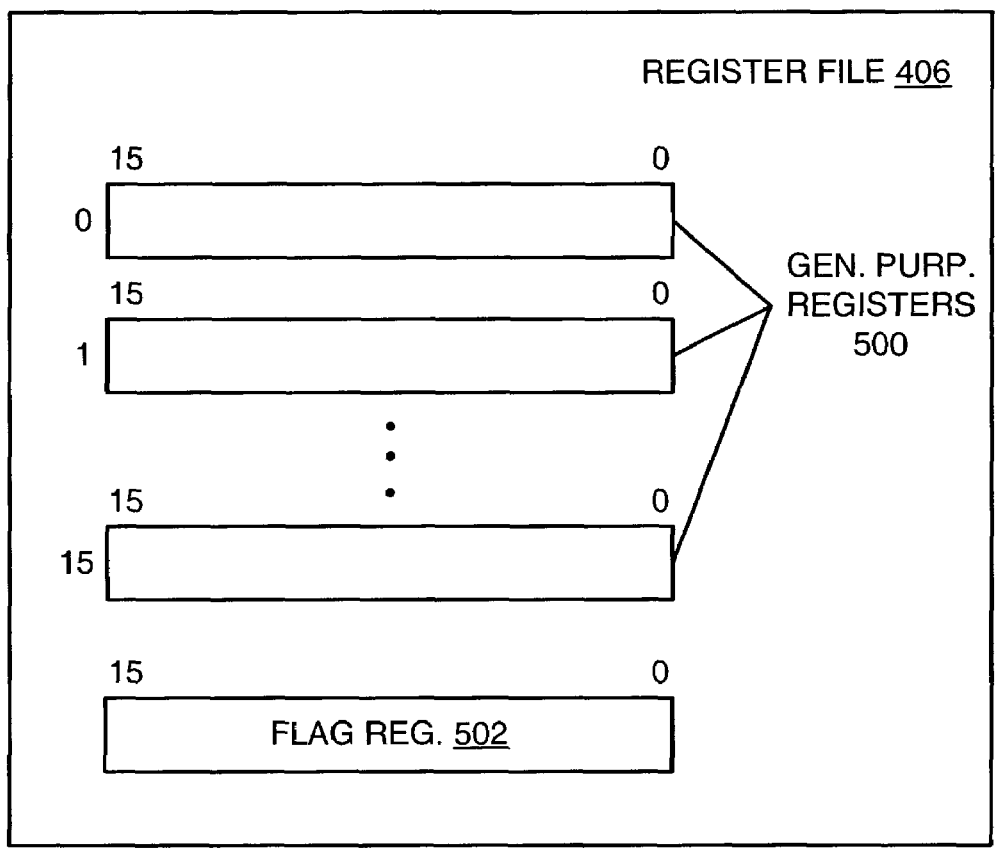
FIG. 5 is a diagram of one embodiment of the register file of FIG. 4, wherein the register file includes multiple general purpose registers and a flag register.

FIG. 5 is a diagram of one embodiment of the register file 406 of FIG. 4, wherein the register file 406 includes sixteen 16-bit general purpose registers 500 numbered 0 through 15 and a flag register 502.

Figure 6:
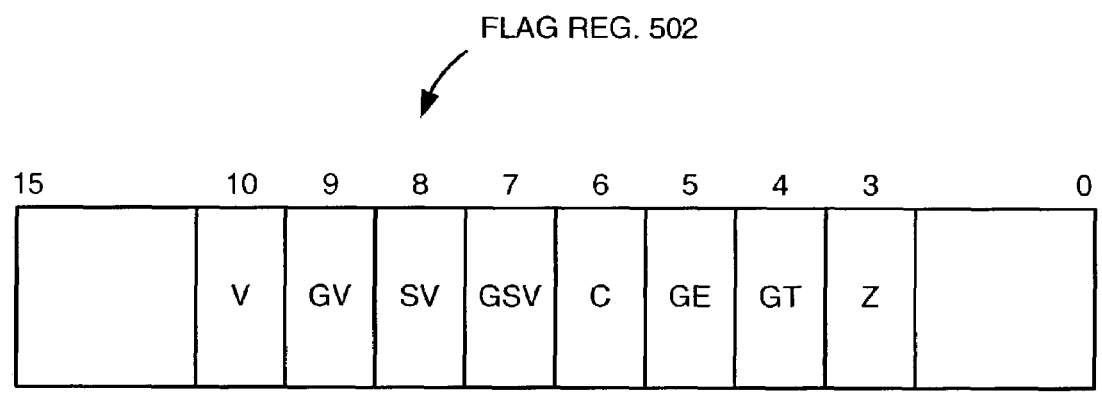
FIG. 6 is a diagram of one embodiment of the flag register of FIG. 5.

FIG. 6 is a diagram of one embodiment of the flag register 502 of FIG. 5. In the embodiment of FIG. 6A, the flag register 502 includes the flag bits v, gv, sv, gsv, c, ge, gt, and z described above.

Figure 7:
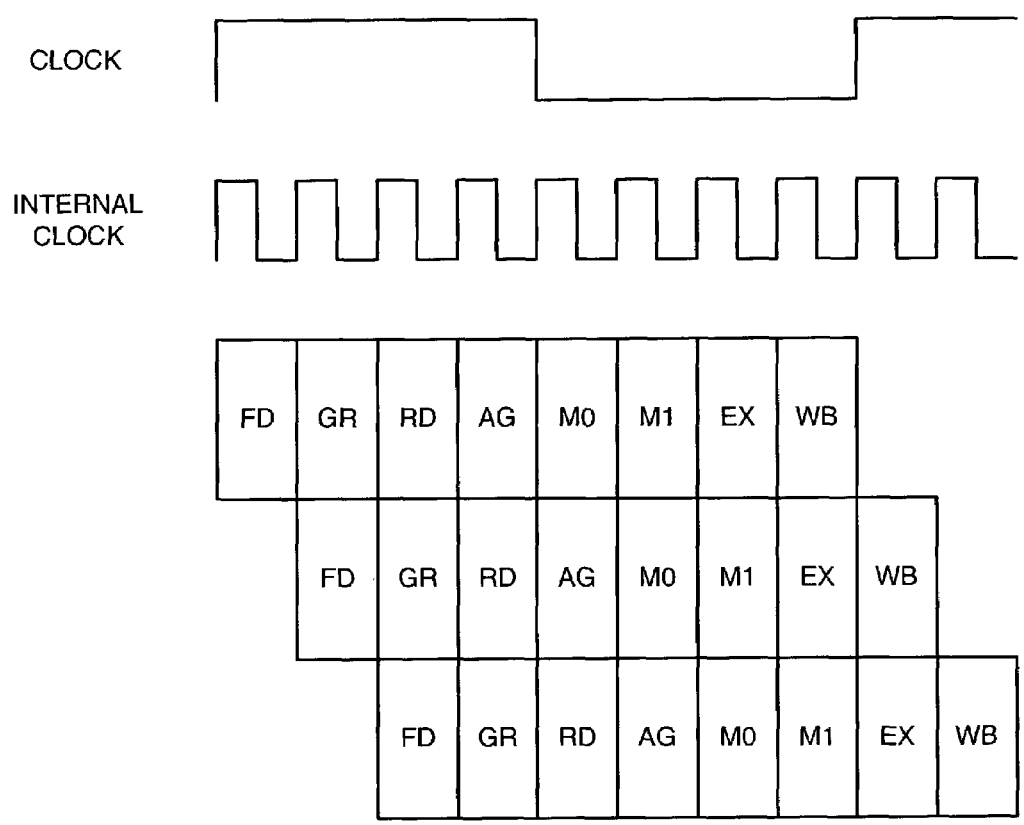
FIG. 7 is a diagram illustrating an instruction execution pipeline implemented within the processor of FIG. 4 by the pipeline control unit of FIG. 4.

FIG. 7 is a diagram illustrating the instruction execution pipeline implemented within the processor 102 of FIG. 4 by the pipeline control unit 408 of FIG. 4. The instruction execution pipeline (pipeline) allows overlapped execution of multiple instructions. In the example of FIG. 7, the pipeline includes 8 stages: a fetch/decode (FD) stage, a grouping (GR) stage, an operand read (RD) stage, an address generation (AG) stage, a memory access 0 (M0) stage, a memory access 1 (M1) stage, an execution (EX) stage, and a write back (WB) stage.

The processor 102 of FIG. 4 uses the CLOCK signal to generate an internal clock signal having a frequency 8 times that of the CLOCK signal. As indicated in FIG. 7, operations in each of the 8 pipeline stages are completed during a single cycle of the internal clock signal, and every instruction is executed within the processor 102 in a single cycle of the CLOCK signal.

Referring to FIGS. 4 and 7, the instruction unit 400 of FIG. 4 fetches several instructions (e.g., 6 instructions) from the memory system 104 of FIG. 1 during the fetch/decode (FD) pipeline stage of FIG. 7, decodes the instructions, and provides the decoded instructions to the pipeline control unit 408.

During the grouping (GR) stage, the pipeline control unit 408 checks the multiple decoded instructions for grouping and dependency rules, and passes one or more of the decoded instructions conforming to the grouping and dependency rules on to the read operand (RD) stage as a group. During the read operand (RD) stage, the pipeline control unit 408 obtains any operand values, and/or values needed for operand address generation, for the group of decoded instructions from the register file 406.

During the address generation (AG) stage, the pipeline control unit 408 provides any values needed for operand address generation to the load/store unit 402, and the load/store unit 402 generates internal addresses of any operands located in the memory system 104 of FIG. 1. During the memory address 0 (M0) stage, the load/store unit 402 translates the internal addresses to external memory addresses used within the memory system 104 of FIG. 1.

During the memory address 1 (M1) stage, the load/store unit 402 uses the external memory addresses to obtain any operands located in the memory system 104 of FIG. 1. During the execution (EX) stage, the execution unit 404 uses the operands to perform operations specified by the one or more instructions of the group. During a final portion of the execution (EX) stage, valid results (including qualified results) are stored in registers of the register file 406.

During the write back (WB) stage, valid results (including qualified results) of store instructions, used to store data in the memory system 104 of FIG. 1 as described above, are provided to the load/store unit 402. Such store instructions are typically used to copy values stored in registers of the register file 406 to memory locations of the memory system 104.

Referring to FIGS. 1, 4, 5 and 7, the conditional execution instruction 108 of FIG. 1 is typically one of several instructions (e.g., 6 instructions) fetched from the memory system 104 by the instruction unit 400 of FIG. 4 and decoded during the fetch/decode (FD) stage. During the execution (EX) stage of the conditional execution instruction 108, the pipeline control unit 408 of FIG. 4 accesses the register specified by the conditional execution instruction 108 (e.g., the flag register 502 of FIG. 5 or one of the general purpose registers 500 of FIG. 5), and tests the specified register for the specified condition.

During the execution (EX) stage of each of the instructions of the code block 110 of FIG. 1, the pipeline control unit 408 of FIG. 4 produces a signal dependent on whether the specified condition existed in the specified register during the execution stage of the conditional execution instruction 108 of FIG. 1, and provides the signal to the execution unit 404 of FIG. 4. The execution unit 404 saves results of the instructions of the code block 110 dependent upon the signal. For example, if the specified condition existed in the specified register during the execution (EX) stage of the conditional execution instruction 108, the pipeline control unit 408 may assert the signal during the execution (EX) stage of each of the instructions of the code block 110, and the execution unit 404 may provide the results of the instructions of the code block 110 to the register file 406 of FIGS. 4-5 only when the signal is asserted.

In the embodiment of FIG. 7, if the condition specified by the conditional execution instruction 108 of FIG. 1 is true, the results of the instructions making up the code block 110 of FIG. 1 are qualified, and the results are written to the register file 406 of FIGS. 4-5 during the corresponding execution (EX) stages. If the specified condition is not true, the results of the instructions of the code block 110 are not qualified, and are not written to the register file 406 during the corresponding execution stages (i.e., are ignored).

For example, an assembly language syntax for a "cexe" version of the conditional execution instruction 108 of FIG. 1 may be:

cexe (cond, U) {
code block instruction 1
code block instruction 2
...
} where cond={v, nv, gv, ngv, sv, nsv, gsv, ngsv, c, nc, ge, nge, gt, ntg, z, nz} in the flag register, <flag bit> signifies the flag bit=1, and n<flag bit> signifies the flag bit=0; and U=update bit={'0' for do not update, '1' for update}.

In this situation, the code block 110 of FIG. 1 includes the instructions between the brackets "{" and "}."

Consider the assembly language code lines:
cmp r0,r1 //if r0 = r1 then r2 = r2 + 1
cexe (z, 0) {
add r2,1
} and assume the general purpose registers 500 of FIG. 5 include the registers r0, r1, and r2. By virtue of a root encoding field (e.g., the root encoding field 206 of FIG. 2A), the conditional execution instruction cexe specifies the flag register 502 of FIG. 5. Referring to FIG. 7, the compare instruction cmp and the conditional execution instruction cexe may, for example, be in the execution (EX) stage at the same time. During the cycle of the internal clock signal that the compare instruction cmp and the conditional execution instruction cexe are in the execution (EX) stage: (i) the execution unit 404 either sets or clears the z flag bit in the flag register 502 dependent upon a result of the compare instruction cmp, and (ii) the pipeline control unit 408 accesses the flag register 502, and tests the flag register 502 to determine if the z flag bit is set.

When the compare instruction cmp and the conditional execution instruction cexe are in the execution (EX) stage, the add instruction "add" may, for example, be in the memory access 1 (M1) stage. In this situation, the add instruction is in the execution (EX) stage during the next cycle of the internal clock signal. During the next cycle of the internal clock signal, the pipeline control unit 408 of FIG. 4 produces a signal dependent on whether the z flag bit in the flag register 502 of FIG. 5 was set during the previous cycle of the internal clock signal, and provides the signal to the execution unit 404 of FIG. 4. The execution unit 404 provides the result of the add instruction to the register file 406 of FIGS. 4-5 to be stored in the general purpose register r2 dependent upon the signal from the pipeline control unit 408. For example, the pipeline control unit 408 may assert the signal only if the z flag bit in the flag register 502 was set during the previous cycle of the internal clock signal, and the execution unit 404 may provide the result of the add instruction to the register file 406 to be stored in the general purpose register r2 only if the signal from the pipeline control unit 408 is asserted.

Figure 8:
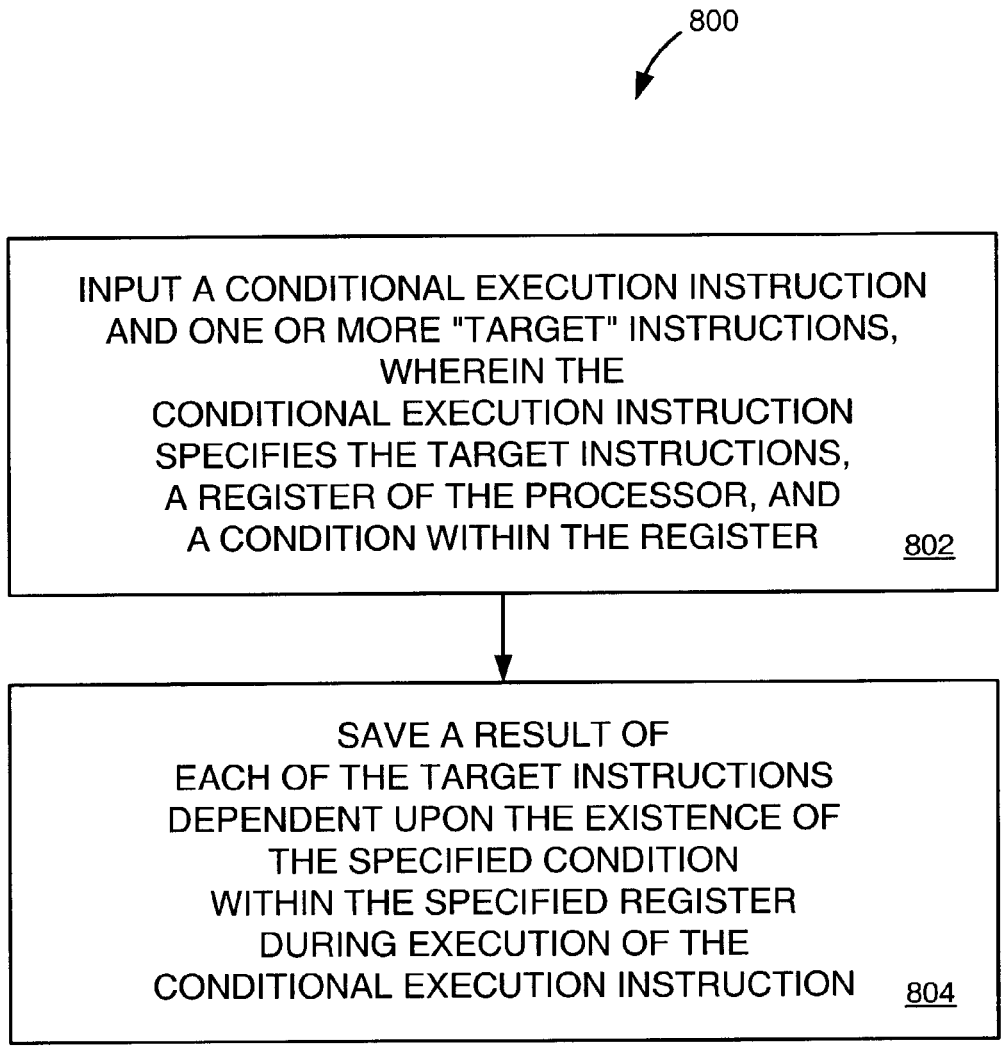
FIG. 8 is a flow chart of one embodiment of a method for conditionally executing one or more instructions.

FIG. 8 is a flow chart of one embodiment of a method 800 for conditionally executing one or more instructions (e.g., instructions of the code block 110 of FIG. 1). The method 800 may be embodied within the processor 102 of FIGS. 1 and 4. During an operation 802 of the method 800, a conditional execution instruction (e.g., the conditional execution instruction 108 of FIG. 1) and the one or more instructions to be conditionally executed (i.e., "target instructions") are input (i.e., fetched or received). The conditional execution instruction specifies the one or more target instructions, a register (e.g., the flag register 502 of FIG. 5 or one of the general purpose registers 500 of FIG. 5), and a condition within the register (e.g., according to an encoding of a condition specification bit or field). A result of each of the one or more target instructions is saved (e.g., by the execution unit 404 of FIG. 4) dependent upon the existence of the specified condition in the specified register during execution of the conditional execution instruction during an operation 804.

It will be appreciated by those skilled in the art having the benefit of this disclosure that this invention is believed to include systems and methods for conditionally executing one or more software program instructions. Further modifications and alternative embodiments of various aspects of the invention will be apparent to those skilled in the art in view of this description. It is intended that the following claims be interpreted to embrace all such modifications and changes and, accordingly, the drawings and the specification are to be regarded in an illustrative rather than a restrictive sense.

What is claimed is:

1. A processor, comprising:
an instruction unit configured to fetch and decode a conditional execution instruction and at least one target instruction, wherein the conditional execution instruction specifies the at least one target instruction, a register of the processor, and a condition within the register, wherein the at least one target instruction comprises a code block including a plurality of consecutive instructions, and wherein the conditional execution instruction comprises a field specifying an exact size of the code block; and
an execution unit operably coupled to the instruction unit and configured to save, in accordance with the conditional execution instruction, a result of the at least one target instruction, upon the existence of the specified condition in the specified register during execution of the conditional execution instruction, wherein the execution unit is configured to store the result only in the event the specified condition exists in the specified register during execution of the conditional execution instruction; otherwise the execution unit is configured to discard the result.

2. The processor as recited in claim 1, wherein the conditional execution instruction precedes the at least one target instruction in a software program.

3. The processor as recited in claim 1, wherein the conditional execution instruction is a fixed-length instruction.

4. The processor as recited in claim 1, wherein the conditional execution instruction comprises a field specifying the register.

5. The processor as recited in claim 1, wherein the conditional execution instruction comprises at least one bit position specifying the condition within the register.

6. The processor as recited in claim 1, wherein the register is a flag register or a general purpose register within the processor.

7. The processor as recited in claim 1, wherein the execution unit is configured to perform an operation specified by each of the at least one target instruction, thereby producing the result of the at least one target instruction.

8. A processor, comprising:
a register file comprising a plurality of registers;
an instruction unit configured to:
fetch and decode a conditional execution instruction, thereby producing a decoded conditional execution instruction, wherein the conditional execution instruction specifies a target instruction, a specified register of the register file, and a condition within the specified register, wherein the target instruction comprises a code block including a plurality of consecutive instructions, and wherein the conditional execution instruction comprises a field specifying an exact size of the code block; and
fetch and decode the target instruction, thereby producing a decoded target instruction;
a pipeline control unit coupled to receive the decoded conditional execution instruction and configured to access the specified register during execution of the conditional execution instruction in response to the decoded conditional execution instruction, and to generate a signal dependent upon the existence of the specified condition in the specified register during execution of the conditional execution instruction; and
an execution unit coupled to receive the decoded target instruction and the signal, and configured to perform an operation specified by the decoded target instruction, thereby producing a result, and, based on content of the conditional execution instruction, to save or discard the result dependent upon the signal.

9. The processor as recited in claim 8, wherein the pipeline control unit is configured to assert the signal in the event the specified condition exists in the specified register during execution of the conditional execution instruction, and wherein the execution unit is configured to store the result of the target instruction only in the event the signal is asserted.

10. A memory system, comprising:
a conditional execution instruction;
at least one target instruction comprising a code block including a plurality of consecutive instructions, wherein the conditional execution instruction comprises a field specifying an exact size of the code block; and
wherein the conditional execution instruction specifies the at least one target instruction, a register, and a condition within the register, such that a result of the at least one target instruction based on execution thereof is saved or discarded dependent upon whether the condition in the register as identified by the conditional execution instruction is met during execution of the conditional execution instruction.

11. The memory system as recited in claim 10, wherein the conditional execution instruction precedes the at least one target instruction in a software program stored in the memory medium.

12. A method for conditionally executing at least one target instruction, the method comprising:
inputting a conditional execution instruction and the at least one target instruction, wherein the conditional execution instruction specifies the at least one target instruction, a register, and a condition within the register, wherein the at least one target instruction comprises a code block including a plurality of consecutive instructions, and wherein the conditional execution instruction comprises a field specifying an exact size of the code block; and
saving or discarding a result of each of the at least one target instruction dependent upon the existence of the specified condition in the specified register, as identified by the conditional execution instruction, during execution of the conditional execution instruction.

13. The method as recited in claim 12, wherein the conditional execution instruction precedes the at least one target instruction in a software program.

14. The method as recited in claim 12, wherein the conditional execution instruction comprises a field specifying the code block.

15. The method as recited in claim 12, wherein the conditional execution instruction comprises a first field specifying the at least one instruction, a second field specifying the register, and at least one bit position specifying the condition within the register.

16. The method as recited in claim 12, wherein the inputting comprises:
fetching a conditional execution instruction and the at least one target instruction from a memory system, wherein the conditional execution instruction specifies the at least one instruction, a register, and a condition within the register.

17. The method as recited in claim 12, further comprising:
accessing the specified register during execution of the conditional execution instruction to determine the existence of the specified condition in the specified register during execution of the conditional execution instruction.

18. The method as recited in claim 12, wherein the saving comprises:
saving a result of each of the at least one instruction in a register file dependent upon the existence of the specified condition in the specified register during execution of the conditional execution instruction.

19. The method as recited in claim 12, wherein the saving comprises:
saving a result of each of the at least one target instruction only in the event the specified condition exists in the specified register during execution of the conditional execution instruction.

* * * * *